(12) United States Patent
Li et al.

(10) Patent No.: US 8,731,484 B2
(45) Date of Patent: *May 20, 2014

(54) MITIGATING INTERFERENCE IN A COMMUNICATION NETWORK

(75) Inventors: Junyi Li, Chester, NJ (US); Saurabha Rangrao Tavildar, Jersey City, NJ (US); Rajiv Laroia, Far Hills, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,477

(22) Filed: Jun. 25, 2012

(65) Prior Publication Data
US 2012/0263249 A1  Oct. 18, 2012

Related U.S. Application Data

(62) Division of application No. 12/434,368, filed on May 1, 2009, now Pat. No. 8,229,369.

(51) Int. Cl.
*H04B 1/44* (2006.01)

(52) U.S. Cl.
USPC .............................................. 455/78; 455/83

(58) Field of Classification Search
USPC ................... 455/78, 80–83, 20, 75, 88, 129
See application file for complete search history.

(56) References Cited

U.S. PATENT DOCUMENTS

| | | | |
|---|---|---|---|
| 7,451,065 B2 * | 11/2008 | Pednault et al. | 703/2 |
| 7,876,701 B2 | 1/2011 | Li et al. | |
| 8,005,091 B2 | 8/2011 | Wu et al. | |
| 8,189,491 B2 | 5/2012 | Laroia et al. | |
| 8,229,369 B2 | 7/2012 | Li et al. | |
| 8,392,153 B2 * | 3/2013 | Pednault et al. | 703/2 |
| 2003/0176931 A1 * | 9/2003 | Pednault et al. | 700/31 |
| 2004/0236611 A1 | 11/2004 | Bonissone et al. | |

(Continued)

FOREIGN PATENT DOCUMENTS

| | | |
|---|---|---|
| CN | 101133670 A | 2/2008 |
| EP | 1583268 A1 | 10/2005 |
| TW | 200810406 A | 2/2008 |

OTHER PUBLICATIONS

International Search Report and Written Opinion—PCT/US2010/032941, International Search Authority—European Patent Office—Sep. 16, 2010.

(Continued)

*Primary Examiner* — Henry Choe
(74) *Attorney, Agent, or Firm* — Joseph B. Agusta

(57) ABSTRACT

Aspects relate to mitigating interference in a communication network that does not employ a centralized scheduler. A transmission sent on a subset of resources is evaluated to determine a number of communication pairs that have selected that subset of resources on which to transmit. If there are a large number of communication pairs transmitting on that subset, the transmission is ignored by a receiving device. The number of degrees of freedom that contain energy on the subset is evaluated to determine if an expected number of degrees of freedom that should have energy is met or exceeded. If the expected threshold number is met or exceed, the transmission is decoded by the receiving device, else the transmission is not decoded.

17 Claims, 14 Drawing Sheets

(56) References Cited

U.S. PATENT DOCUMENTS

| | | |
|---|---|---|
| 2007/0009067 A1 | 1/2007 | Michalak |
| 2008/0009305 A1 | 1/2008 | Li et al. |
| 2008/0101447 A1* | 5/2008 | Li et al. ......................... 375/222 |
| 2009/0016456 A1 | 1/2009 | Li et al. |
| 2009/0202034 A1 | 8/2009 | Lauritsch et al. |
| 2011/0007658 A1 | 1/2011 | Lindoff et al. |

OTHER PUBLICATIONS

Taiwan Search Report—TW099113973—TIPO—May 15, 2013.

* cited by examiner

MITIGATING INTERFERENCE IN A COMMUNICATION NETWORK

CLAIM OF PRIORITY UNDER 35 U.S.C. §120

The present Application for Patent is a divisional of patent application Ser. No. 12/434,368 entitled "MITIGATING INTERFERENCE IN A COMMUNICATION NETWORK" filed May 1, 2009, and granted under U.S. Pat. No. 8,229,369, and issued on Jul. 24, 2012 and assigned to the assignee hereof and hereby expressly incorporated by reference herein.

BACKGROUND

I. Field

The following description relates generally to wireless communications and more particularly to mitigating interference in a communication network that does not utilize a centralized scheduler.

II. Background

Wireless communication systems are widely deployed to provide various types of communication. For example, voice, data, video, and so forth can be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station or access point. The access point covers a geographic range or cell and, as the mobile device is operated, the mobile device can be moved in and out of these geographic cells.

A network can also be constructed utilizing solely peer-to-peer devices without utilizing access points or the network can include both access points (infrastructure mode) and peer-to-peer devices. These types of networks are sometimes referred to as ad hoc networks. Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

At times, some signals might experience interference, which might be strong interference, from other signals. This interference can be caused by the random deployment that exists in ad hoc networks. For example, in a peer-to-peer ad hoc network, there is no central authority (e.g., base station) that transmits broadcast signals. Thus, synchronization is performed in an informal manner by the devices within the peer-to-peer network. Therefore, a problem that can result in peer-to-peer ad hoc networks is interference since the number of interfering transmitters using the same wireless resource and their interference levels are not known.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with using a certain wireless resource to convey a certain number of bits with the additional constrain that the number of interferers using the same wireless resource and their interference levels are not known.

According to an aspect is a method performed by a receiver device for mitigating interference in a communication network. Method includes selecting a subset from a plurality of disjoint subsets of degrees of freedom as a function of an identifier and monitoring the selected subset to receive a signal from a transmitter device. The identifier is determined by at least one of transmitter device or receiver device. A degree of freedom corresponds to a communication resource unit of the communication network.

Another aspect relates to a wireless communications apparatus that includes a memory and a processor. The memory retains instructions related to choosing a subset from a plurality of disjoint subsets of degrees of freedom as a function of an identifier and monitoring the selected subset to receive a signal. A degree of freedom corresponds to a communication resource unit of a communication network. The identifier is determined by at least one of a transmitter device, or a receiver device, or combinations thereof. The processor is coupled to the memory and is configured to execute the instructions retained in the memory.

A further aspect relates to a wireless communications apparatus that mitigates interference in a communication network. The communication apparatus includes means for choosing a subset from a plurality of disjoint subsets of degrees of freedom as a function of a chosen identifier. A degree of freedom corresponds to a communication resource unit of the communication network and the communication resource unit is separated into the plurality of disjoint subsets of degrees of freedom. The communication apparatus also includes means for reviewing the selected subset in order to receive a signal from a peer node.

Still another aspect relates to a computer program product that comprises a computer-readable medium. Included in the computer-readable medium is a first set of codes for causing a computer to select a subset from a plurality of disjoint subsets of degrees of freedom as a function of an identifier. The identifier is determined by at least one of a transmitter device, a receiver device, or both the transmitter device and the receiver device. A degree of freedom corresponds to a communication resource unit of the communication network. Also included in computer-readable medium is a second set of codes for causing the computer to evaluate the selected subset to receive a signal.

Yet another aspect relates to at least one processor configured to mitigate interference in a communication network that does not have a centralized scheduler. Processor includes a first module for selecting a subset from a plurality of disjoint subsets of degrees of freedom as a function of an identifier. The selected subset comprises a plurality of resource blocks. Processor also includes a second module for selecting at least one degree of freedom within each of the plurality of resource blocks and a third module for monitoring the selected subset to receive a signal. Also included in processor is a fourth module for estimating a number of interfering transmitters as a function of energy of the received signal in the degrees of freedom of each selected subset. Further, processor includes a fifth module for selectively decoding a message from the received signal in the selected degrees of freedom based on a comparison of the estimated number of interfering transmitters with an interference threshold.

A further aspect relates to a method for operating a transmitter device for mitigating interference in a communication network. Method includes selecting a subset from a plurality of disjoint subsets of degrees of freedom as a function of an identifier and transmitting a signal to the receiver device using the selected subset. The identifier is determined by at least one of the transmitter device, a receiver device, or combinations thereof. A degree of freedom corresponds to a communication resource unit of the communication network.

Another aspect relates to a wireless communications apparatus that includes a memory and a processor. The memory retains instructions related to choosing a subset from a plurality of disjoint subsets of degrees of freedom as a function of a chosen identifier and transmitting a signal to a receiver device using the selected subset. A degree of freedom corresponds to a communication resource unit of a communication network. The processor is coupled to the memory and is configured to execute the instructions retained in the memory.

Yet another aspect relates to a wireless communications apparatus that mitigates interference in a communication network. The communication apparatus includes means for choosing a subset from a plurality of disjoint subsets of degrees of freedom as a function of an identifier. Communication apparatus also includes means for conveying a signal using the selected subset. A degree of freedom corresponds to a communication resource unit of the communication network.

Still another aspect relates to a computer program product comprising a computer-readable medium. Included in computer-readable medium is a first set of codes for causing a computer to select a subset from a plurality of disjoint subsets of degrees of freedom as a function of an identifier. The identifier is determined by one or more of a transmitter device, a receiver device, or combinations thereof. A degree of freedom corresponds to a communication resource unit of a communication network. The communication resource is divided into the plurality of disjoint subsets of degrees of freedom and the plurality of disjoint subsets are fixed. Also included in computer-readable medium is a second set of codes for causing the computer to transmit a signal to the receiver device using the selected subset.

A further aspect relates to at least one processor configured to mitigate interference in a communication network that does not have a centralized scheduler. Processor includes a first module for selecting a subset from a plurality of disjoint subsets of degrees of freedom as a function of an identifier. The identifier is determined by at least one of the transmitter device or a receiver device. A degree of freedom corresponds to a communication resource unit of the communication network. Processor also includes a second module for transmitting a signal to the receiver device using the selected subset. The transmitted signal is a paging signal and the identifier is a paging identifier of the receiver device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
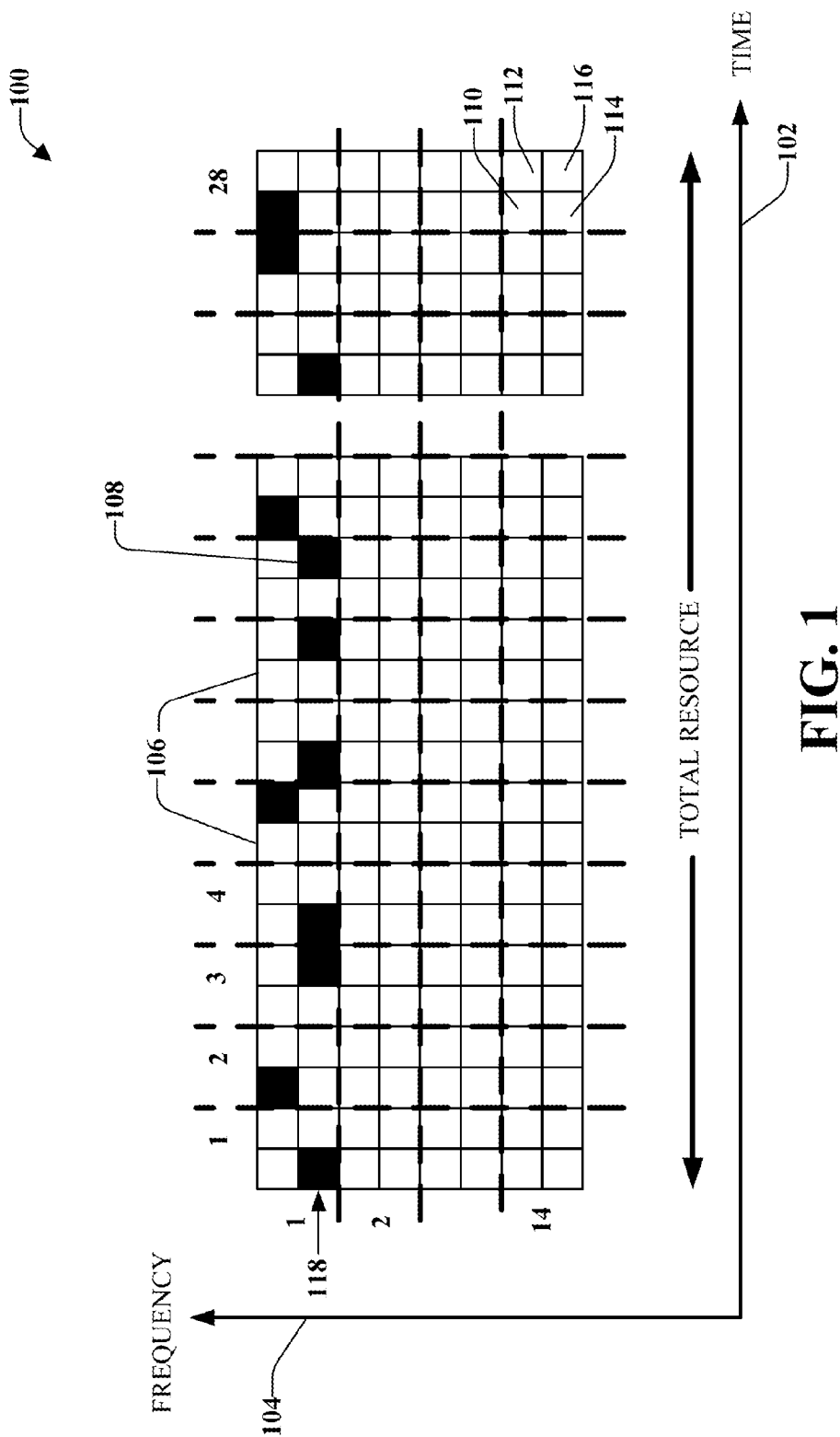
FIG. 1 illustrates a schematic representation of a set of resources available for communication within a communication network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so forth, discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

FIG. 1 illustrates a schematic representation of a set of resources 100 available for communication within a communication network. Horizontal axis 102 represents time and vertical axis 104 represents frequency. A vertical column, of which a few are labeled at 106, represents resources (e.g., tones) in a given symbol period. Each small box, such as box 108, represents a tone-symbol, which is a single tone over a single transmission symbol period. A degree of freedom in an OFDM symbol is a tone-symbol 108, representing a basic unit of the wireless resource. In accordance with some aspects, set of resources 100 can have N degrees of freedom, where N is an integer.

For purposes of explanation, assume a wireless resource with N degrees of freedom. This resource is being shared by an unknown number of communication pairs. Each communication pair wants to communicate a number of bits. Further, there is no central coordinator to allocate resources among these communication pairs. A simple solution would involve dividing the N degrees of freedom into distinct subsets and each communication pair randomly chooses one of the subsets and transmits on that entire subset. This is similar to a random access scheme and can have potential failure in the case of a collision (e.g., two or more communication pairs chose the same subset on which to communicate). The disclosed aspects overcome the situation of interference and the situation where a dominant interferer (e.g., interfering transmitter) causes a communication failure (e.g., interference).

The set of N degrees of freedom can be divided into M disjoint subsets, for example, with K=N/M, where K is the number of degrees of freedom in each subset. In an aspect, the partition of the total N degrees of freedom into the M disjoint subsets is fixed and divided in a pre-determined manner.

For purposes of explanation, the following will discuss a wireless resource comprising 28 tones, along the vertical axis, and 56 symbols, along the horizontal axis. The 28 tones can be divided into 14 tone subsets, each tone subset consisting of two adjacent tones, as illustrated along the left side of vertical axis 104 as 1, 2, . . . 14. Then, M=14, and each disjoint subset of degrees of freedom contains a plurality of resource blocks. For example, there is horizontal partitioning where the 56 symbols are divided into 28 different symbol subsets, each symbol subset contains two adjacent symbols, as illustrated along the top horizontal axis 102 as 1, 2, 3, 4, . . . 28. In this example, a resource block includes two adjacent tones over two adjacent symbols. In an aspect, the partition of a subset into a plurality of resource blocks is fixed and performed in a pre-determined manner.

Figure 2:
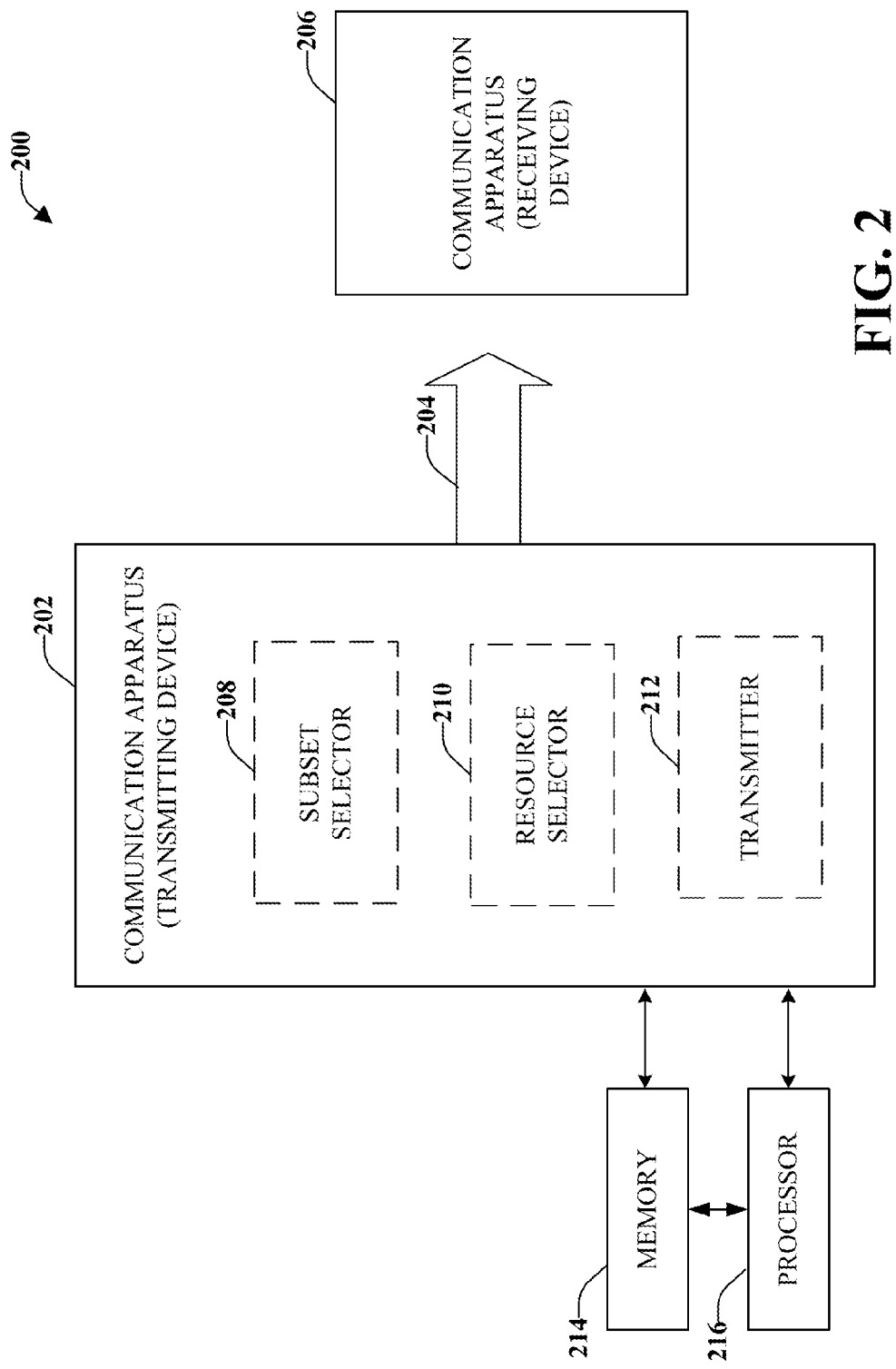
FIG. 2 illustrates a system for transmitting information in a manner that mitigates interference, according to an aspect.

Further aspects will now be described with reference also to FIG. 2, which illustrates a system 200 for transmitting information in a manner that mitigates interference, according to an aspect. A communication apparatus 202 can be included in system 200, which can be a communication network that includes a multitude of communication apparatuses that communicate with each other as communication pairs (e.g., a first communication apparatus is paired with a second communication apparatus). In accordance with some aspects, communication network does not include a centralized scheduler.

Communication apparatus 202 is shown to be transmitting data through a channel 204. Although depicted as transmitting data, communication apparatus 202 can also receive data through the channel 204 (e.g., communication apparatus 202 can transmit and receive data at substantially the same time, communication apparatus 202 can transmit and receive data at different times, or combinations thereof).

Communication apparatus 202, sometimes referred to herein as transmitting device or Device A, can be paired with another apparatus 206, sometimes referred to herein as receiving device or Device B. Included in communication apparatus 202 is a subset selector 208 that is configured to select one of the M disjoint subsets on which to transmit (and transmits on that entire subset). Thus, subset selector 208 can choose one from the M disjoint subsets (1 through 14) along the vertical axis 104 (of FIG. 1). The subset selection can be based on an identifier determined by transmitting device 202, receiving device 206, or both transmitting device 202 and receiving device 206. For example if transmitting device 202 is to send a paging signal to receiving device 206, the identifier can be a paging identifier of receiving device 206. Thus, even if receiving device 206 does not know the identity of transmitting device 202, receiving device 206 can still monitor the correct subset for a possible paging signal (e.g., receiving device 206 knows which subset to monitor based on receiving device's identifier).

Each M disjoint subset includes a multitude of resource blocks. Each resource block includes a plurality of degrees of freedom. For example, in FIG. 1, each resource block includes four degrees of freedom. The resource block illustrated on the right bottom corner of FIG. 1 includes four degrees of freedom labeled 110, 112, 114, and 116. Each degree of freedom corresponds to a communication resource unit of the communication network.

Also included in communication apparatus 202 is a resource selector 210 that is configured to select at least one of the K degrees of freedom in each resource block within the chosen M subset. For example, resource selector 210 can select various degrees of freedom, as illustrated by the black boxes in FIG. 1 (e.g., box 118), wherein there is one black box (chosen degree of freedom) in each resource block along the chosen subset. In accordance with some aspects, resource selector 210 can choose the degrees of freedom based on an identifier.

Also included in apparatus 202 is a transmitter 212 that is configured to transmit information on the selected resources. In accordance with some aspects, transmitter 212 can use some of the selected resources to transmit a pilot and use the remaining selected resources to transmit phase and/or amplitude modulated signals to convey certain message information (e.g., a paging message).

When transmitting device 202 transmits a signal to intended receiving device 206, the signal is transmitted over the chosen degrees of freedom in the resource blocks in the chosen subset (e.g., the black boxes in FIG. 1). When another transmitting device (not shown) is transmitting, that device might select the same subset and further select one degree of freedom in each resource block. In a given resource block the two (or more) transmitting devices might select the same or different degrees of freedom. When at least two transmitting devices selected the same degree of freedom, the signals collide.

A memory 214 can be operatively coupled to communication apparatus 202. Memory 214 can be external to communication apparatus 202 or can reside within communication apparatus 202. Memory 214 can store information related to selecting one of M disjoint subsets, choosing a degree of freedom within each block of the selected subset, and transmit a signal on the chosen degrees of freedom. Further, memory 214 can store other suitable information related to signals transmitted and received in a communication network. A processor 216 can be operatively connected to communication apparatus 202 (and/or memory 214) to facilitate analysis of transmitting information in a communication network. Processor 216 can be a processor dedicated to analyzing and/or generating information received by communication apparatus 202, a processor that controls one or more components of system 200, and/or a processor that both analyzes and generates information transmitted by communication apparatus 200 and controls one or more components of system 200.

Memory 214 can store protocols associated with mitigating interference in a communication network without a centralized scheduler, taking action to control communication between communication apparatus 202 and other devices, such that system 200 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 3:
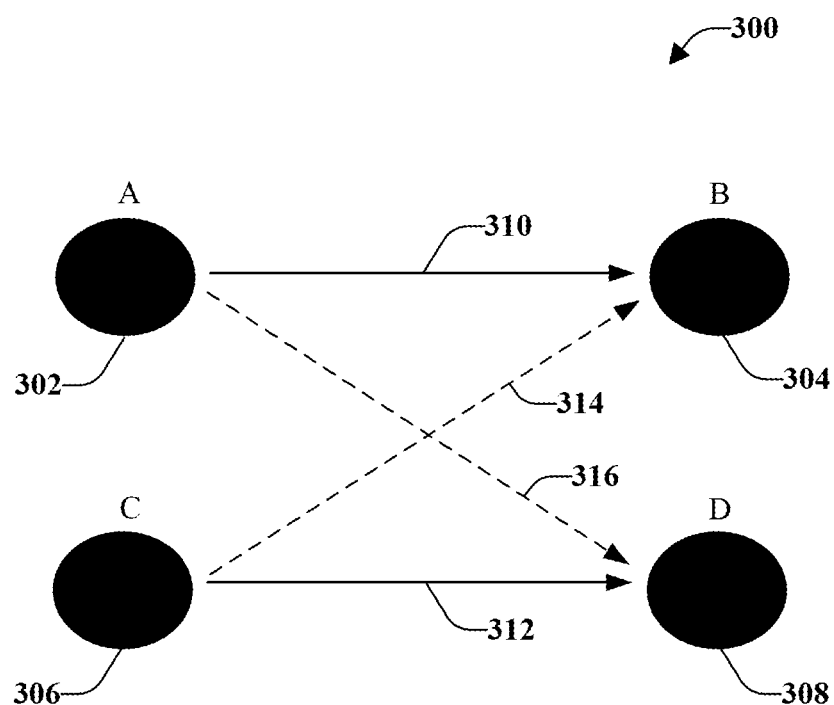
FIG. 3 illustrates a schematic representation of signaling and interference within a communication network

As discussed above, there can be multiple communication pairs in a communication network. For example, FIG. 3 illustrates a schematic representation 300 of signaling and interference within a communication network. Illustrated are four devices, Device A 302, Device B 304, Device C 306, and Device D 308. Device A 302 is attempting to send a signal 310 to Device B 304. The signal can be a paging signal that indicates Device A 302 intends to establish a connection with Device B 304. At substantially the same time, Device C is attempting to send a signal 312 to Device D 308. These two signals 310 and 312 might interfere with each other such that Device B 304 receives signal 310 as well as interfering signal 314 from Device C 306. Thus, Device C 306 is an interfering transmitter as far as Device B 304 is concerned. In a similar manner, Device D 308 might receive signal 312 and an interfering signal 316 from Device A 302. Thus, at times, Device A 302 can be an interfering transmitter as far as Device D 308 is concerned.

However, in some communication networks, such as the illustrated network 300, there is no centralized authority to schedule the resources between Device A 302 and Device C 306. Thus, there is no controller to mitigate cross interference, illustrated at 314 and 316. Further, without a centralized authority, there is no entity that authorizes the transmissions of Devices A 302 and C 306. For purposes of this detailed description, the behavior of Devices A 302 and B 304 is similar to the behavior of Devices C 306 and D 308. Further, it should be understood that a communication network can have any number of devices and only four devices are illustrated for purposes of simplicity.

As discussed above, there can be multiple communication pairs. A transmitting device (e.g., apparatus 202 of FIG. 2, Node A 302, and/or Node C 306) selects one of the M disjoint subsets on which to transmit and within that selected subset selects at least one degree of freedom in each resource block, based on an identifier of the receiving device (e.g., apparatus 206 of FIG. 2, Node B 304, and/or Node D 308). The receiving devices (e.g., Device B 304 and Device D 308) know the M subset on which they should receive information, based on their respective IDs, for example. If the resources for Devices B 304 and D 308 happen to map to different subsets, the signals will not interfere. However, in the situation where Devices A 302 and C 306 choose the same subset, interface can occur. For example, consider the case where Devices A 302 and C 306 happen to choose the same subset and the same degree of freedom in at least one resource block within that subset, illustrated by block 118 (of FIG. 1). In this situation, a collision will occur since information for both devices has been sent on the same resource. It should be noted that the selection of resources is determined time interval by time interval, thus, on a subsequent time interval, there might not be a collision (e.g., devices A 302 and C 306 choose a different resource in a subsequent signaling time interval).

Figure 4:
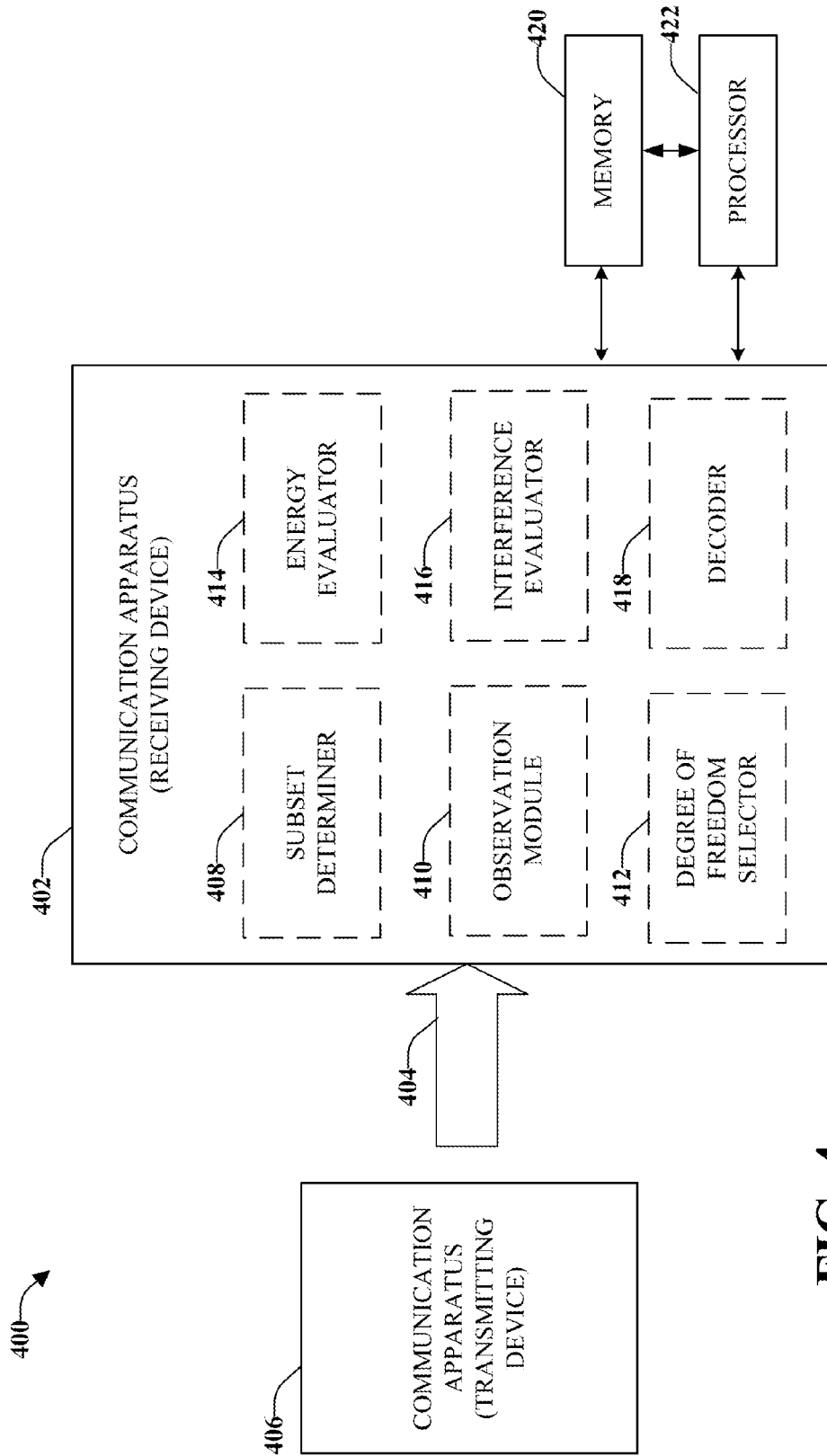
FIG. 4 illustrates a communication apparatus that receives information in a manner that mitigates interference, according to an aspect.

FIG. 4 illustrates a system 400 that receives information in a manner that mitigates interference, according to an aspect. Included in system 400 is a communication apparatus 402 that is shown to be receiving data through a channel 404. Although depicted as receiving data, communication apparatus 402 can also transmit data through the channel 404 (e.g., communication apparatus 402 can transmit and receive data at substantially the same time, communication apparatus 402 can transmit and receive data at different times, or combinations thereof).

Communication apparatus 402, also referred to as receiving device, is aware of the degrees of freedom on which information is expected to be received (e.g., transmitting device selected a subset based on an identifier determined by transmitting device 406, receiving device 402, or combinations thereof, as discussed with reference to previous figures). A simple strategy to receive and decode the information would be for communication apparatus 402 to review the expected degrees of freedom and attempt to decode the information on those degrees of freedom. However, this simple strategy does not take into account potential collisions and further does not provide for mitigation of interference.

Thus, communication apparatus 402 should determine if there is interference (e.g., two or more transmitting devices have chosen the same subset and the same degree of freedom in at least one resource block). If it is determined there is a collision, that tone is considered unreliable and apparatus 402 will not attempt to decode that tone.

Apparatus 402 includes a subset determiner 408 that is configured to select a subset from a plurality of disjoint subsets of degrees of freedom. The subset can be selected as a function of an identifier, which can be determined by receiving device 402, transmitting device 406, or both receiving device 402 and transmitting device 406. The degrees of freedom correspond to a communication resource unit of the communication network. Also included is an observation module 410 that is configured to monitor the selected subset in order to receive a signal from transmitting device 406. If there is energy on the selected subset, the energy indicates that there might be a signal intended for receiving device 402. In accordance with some aspects, the received signal is an OFDM signal and a degree of freedom is a tone in an OFDM symbol.

The subset selected by subset determiner 408 can include a multitude of resource blocks. Each resource block can include a number of degrees of freedom. Thus, in accordance with some aspects, apparatus 402 includes a degree of freedom selector 412 that chooses at least one degree of freedom within each of the plurality of resource blocks as a function of the identifier. An energy evaluator 414 can be configured to estimate the number of interfering transmitters as a function of the energy of the received signal in the degrees of freedom of the selected subset. An interference evaluator 416 can be configured to determine if the estimated number of interfering transmitters exceeds a certain interference threshold. If the interference threshold is exceeded, a decoder 418 can discard the received signal. If interference evaluator 416 determines that the number of interfering transmitters does not exceed the interference threshold, decoder 418 can decode the message from the received signal in the selected degrees of freedom.

In accordance with some aspects, energy evaluator 414 can be configured to review the number of degrees of freedom in a particular resource block in a chosen subset and estimate the number of degrees of freedom with energy in that resource block. This provides an indication of the total number of transmitters using that resource, including the desired transmitter as well as interfering transmitters. For example, if a block has two degrees of freedom with energy, it indicates that at least two transmitters are utilizing the same subset. In accordance with some aspects, the number of degrees of freedom with energy is estimated when the energy of the received signal exceeds a threshold level of energy.

For example, in the example of FIG. 1, if only apparatus 402 is receiving a message (e.g., no other devices are using that resource), there should be only 28 tones with energy in the entire subset. However, if another transmitting device is transmitting on the same subset, there will be more than 28 tones with energy. Based on the total number of tones that have energy, apparatus 402 can determine the potential number of interfering transmitters that have selected the same subset.

The determination of the number of interferers can be performed on a block by block analysis. The first resource block, containing four degrees of freedom can be reviewed and if two tones have energy, it indicates that there are two or more transmitters. If a subsequent block has only one tone with energy, it indicates that there is a collision (e.g., multiple transmitters are sending a signal the same tone). If there is a collision, the information in that block is considered not reliable and can be ignored. If it is determined that the number of communication pairs is more than a threshold number of transmitters (e.g., three transmitters), decoding might not be attempted for the entire subset.

In accordance with some aspects, the energy of the received signal might exceed an energy threshold. In this case, energy evaluator 414 can estimate a first number of degrees of freedom among the set of selected degrees of freedom. For example, if a signal were indeed sent to apparatus 402, then apparatus 402 would expect signal energy in the selected degrees of freedom in the resource blocks of the subset (e.g., the black boxes in FIG. 1). Based on this estimate, interference evaluator 416 can determine if the first number is below a first energy threshold, indicating that not a sufficient number of degrees of freedom are estimated to have energy. When the estimate is below the first energy threshold, apparatus 402 may conclude there is no intended signal and, therefore, decoder 418 discards the received signal.

Further, energy evaluator 414 can estimate a second number of degrees of freedom in a resource block in which the energy of the received signal exceeds a second energy threshold. Interference evaluator 416 can determine whether the signal received in the selected degree of freedom is reliable. For example, apparatus 402 estimates that two transmitters have selected the same subset to send the signals (as discussed above). Then, if apparatus 402 estimates only one degree of freedom in a resource block has energy (e.g., the signal energy exceeds an energy threshold), then apparatus 402 may conclude that the two transmitters have selected the same degree of freedom to send the signals. As a result, the received signal on the selected degree of freedom is considered not reliable. However, if apparatus 402 estimates two degrees of freedom in a resource block have energy, then apparatus 402 may conclude that the two transmitters have selected different degrees of freedom to send the signals. As a result, the received signal on the selected degree of freedom is considered reliable. The estimated second number is to estimate whether the received signal on the selected degree of freedom in a resource block is reliable or is not reliable. If not reliable, decoder 418 can discard the received signal in the selected degree of freedom. If the signal is reliable, it is decoded by decoder 418.

Interference evaluator 416 can determine the reliability of the signal as a function of the estimated second number and the estimated number of interfering transmitters. In accordance with some aspects, if the estimated second number is greater than the estimated number of interfering transmitters, the signal received in the selected degree of freedom is determined to be reliable.

Thus, each transmitting device 406 (or element 202 of FIG. 2), based on an identifier known to its intended receiver 402 (or element 206 of FIG. 2) chooses one out the M disjoint subsets on which to transmit. Further, among K degrees of freedom in that subset, transmitting device 406 selects a certain subset (e.g., of size K/4) on which to transmit. In the example of FIG. 1, the K degrees of freedom is divided into a number of resource blocks, each having four degrees of freedom. Transmitting device 406 selects one degree of freedom in each resource block to be the selected degrees of freedom. The selected degrees of freedom is size K/4. Transmitting device 406 transmits the information on this subset of resources.

Receiving device 402 (or element 206 of FIG. 2), based on the identifier transmitter would have used to communicate, wants to determine if any information was transmitted to receiving device. Further, receiving device 402 would like to decode that information. Receiving device 402 determines if there was a transmission to it by reviewing the number of degrees of freedom in the particular subset (of size K) and determines the number of degrees of freedom with energy. If the number is significant (e.g., more than three), receiving device 402 does not attempt decoding. In the example of FIG. 1, if there is one transmitting device 406, then the number of degrees of freedom with energy is expected to be 28. If it is estimated that the number of degrees of freedom with energy in the subset exceeds a certain number (e.g., 36), then receiving device 402 may conclude that there are two transmitting devices. If the number of degrees of freedom with energy in the subset exceeds another number (e.g., 42), then receiving device 406 may conclude there are three transmitting devices. Receiving device 402 evaluates the energy in the selected K/4 degrees of freedom that it was supposed to receive on (in the particular subset that it is expecting to receive in). Receiving device 402 declares that a transmission was received. The threshold above can in turn depend on the estimated number of communication pairs using that resource. If there was a transmission, receiving device 402 decodes the transmission.

In accordance with some aspects, receiving device 402 will in general use the K/4 degrees of freedom that it is expected to receive on for decoding. However, receiving device 420 would also like to mitigate the interference in case there is more than one communication pair using the same subset. In this situation, there can be further structure on how the subset of size K/4 is picked by receiving device 402.

Continuing the above example, each transmitting device 406, based on an identifier that is known to its intended receiving device 402, chooses one out of the M disjoint subsets on which to transmit. Each subset is divided into K/4 further subsets of size four each. Transmitting device 406 chooses one among these four degrees of freedom on which to transmit. Thus, transmitting device 406 selects a total of K/4 degrees of freedom on which to transmit and transmits the information on this subset of resources.

Receiving device 402, based on the identifier that transmitting device 406 would have used to communicate, wants to determine if any information was transmitted to it and, further, would like to decode that information. Therefore, receiving device 402 determines if there was a transmission to it by reviewing the number of degrees of freedom in that particular subset (of size K) and ascertains the number of degrees of freedom with energy. This is given as an indication of the total number of communication pairs using that resource. Receiving device 402 will not attempt decoding if this number is signification (e.g., more than three communication pairs).

Next, receiving device 402 looks at the energy K/4 degrees of freedom that it was supposed to receive on (in the particular subset that it is expecting to receive in). Receiving device 402 confirms that the number of degrees of freedom with energy is above a certain threshold (e.g., 0.9*K/4). If confirmed, receiving device 402 declares that a transmission was received.

The threshold can in turn depend on the estimated number of communication pairs using that resource. If there was a transmission, receiving device 402 will decode the transmission. Based on the number of communication pairs estimated to be using that resource (as discussed above), receiving device 402 makes a decision for each of the K/4 degrees of freedom whether it has been interfered with. For example, the estimate indicated one more communication pair using the same resource. Then, if among the smaller subset of size four, two degrees of freedom carry energy, there has not been a collision (e.g., each communication pair selected a different degree of freedom). However, if only one of the four degrees of freedom has energy, there has been a collision (e.g., both communication pairs selected the same degree of freedom). In the case of a collision, receiving device 402 may wish to discard that degree of freedom, depending on the power level of the interference relative to its own power level. Receiving device 402 thus determines the clean degrees of freedom and utilizes those degrees of freedom to decode the information.

Apparatus 402 can include memory 420 operatively coupled to apparatus 402. Memory 420 can be external to apparatus 402 or can reside within apparatus 402. Memory 420 can store information related to selecting a subset from a plurality of disjoint subsets of degrees of freedom and monitoring the selected subset to receive a signal from a transmitter device. Alternatively or additionally, memory 420 can store information related to selecting at least one degree of freedom in a resource block included in the selected subset, estimating a number of interfering transmitters, and selectively decoding a message from the received signal. Further, memory 420 can store other suitable information related to signals transmitted and received in a communication network. A processor 422 can be operatively connected to apparatus 402 (and/or memory 420) to facilitate analysis of information related to mitigating interference in a communication network. Processor 422 can be a processor dedicated to analyzing and/or generating information received by apparatus 402, a processor that controls one or more components of system 400, and/or a processor that both analyzes and generates information received by apparatus 402 and controls one or more components of system 400. Memory 420 can store protocols associated with mitigating interference, taking action to control communication between apparatus 402 and other devices such that system 400 can employ stored protocols and/or algorithms to achieve improved communications in a wireless network as described herein.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
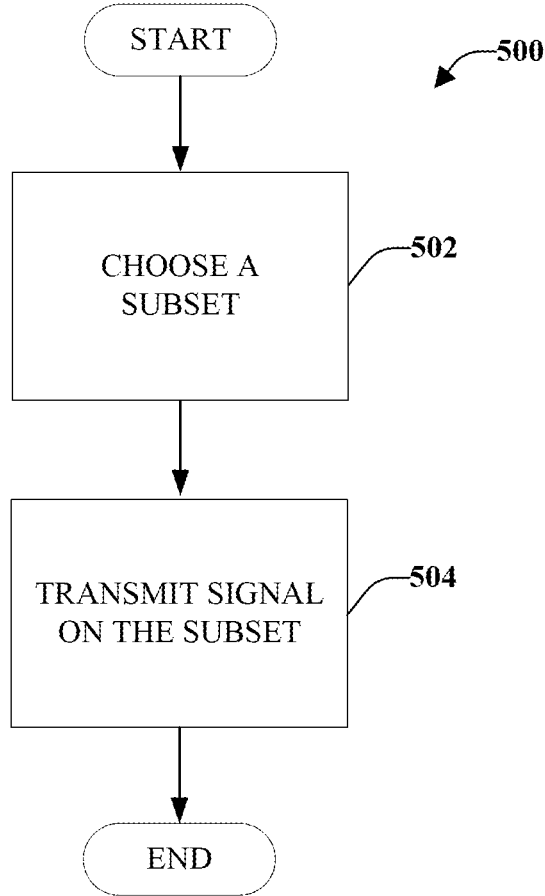
FIG. 5 illustrates a method for operating a transmitter device for mitigating interference in a communication network, according to an aspect.

FIG. 5 illustrates a method 500 for operating a transmitter device for mitigating interference in a communication network, according to an aspect. At 502, a subset is selected from a plurality of disjoint subsets of degrees of freedom. The subset can be selected as a function of an identifier, which can be determined by a transmitter device, a receiver device, or both transmitter device and receiver device. A degree of freedom corresponds to a communication resource unit of the communication network. According to some aspects, the communication resource is divided into a plurality of disjoint subsets of degrees of freedom and the disjoint subsets are fixed.

A signal is transmitted, at 504, to receiver device using the selected subset. In accordance with some aspects, the transmitted signal is an OFDM signal and a degree of freedom is a tone in an OFDM symbol. According to other aspects, the transmitted signal is a paging signal and the identifier is a paging identifier of the receiver device.

Figure 6:
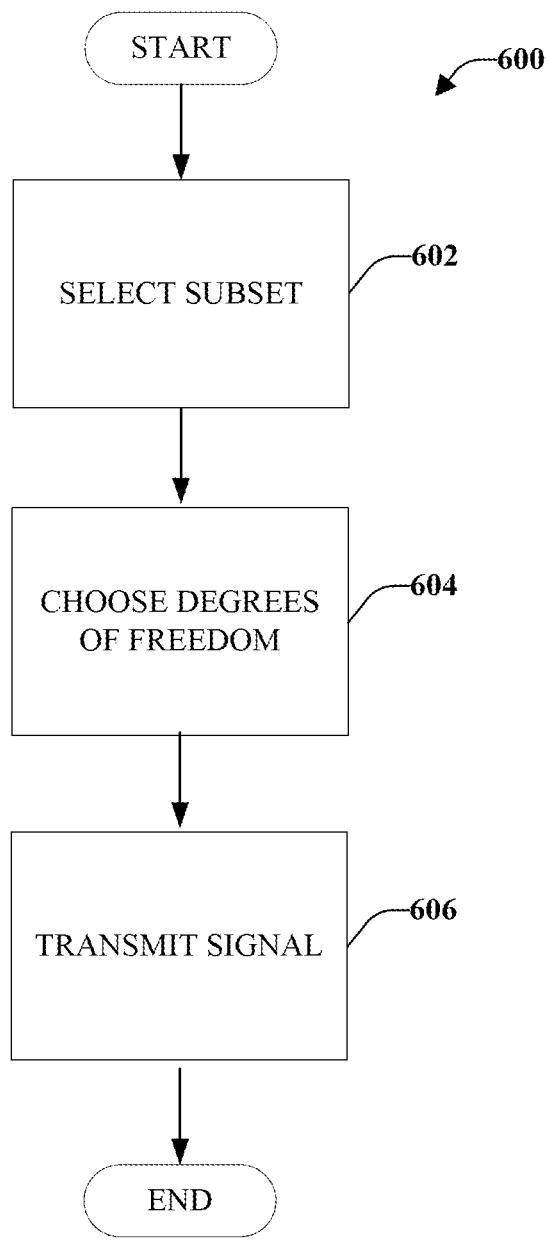
FIG. 6 illustrates a method for mitigating interference when transmitting signals in a communication network, according to an aspect.

FIG. 6 illustrates a method 600 for mitigating interference when transmitting signals in a communication network, according to an aspect. Method 600 starts, at 602, when a subset is selected from a plurality of disjoint subsets of degrees of freedom. The selected subset includes a plurality of resource blocks. Each resource block includes a number of degrees of freedom. At 604, at least one degree of freedom in each of the plurality of resources blocks is chosen. The degrees of freedom can be chosen as a function of the identifier. At 606, a signal is transmitted in the selected degrees of freedom. According to some aspects, the signal is transmitted using at least one of phase and amplitude modulation schemes in the selected degrees of freedom. In these aspects, a pilot is transmitted in at least one of the selected degrees of freedom.

In accordance with various aspects, the number of degrees of freedom within a resource block is fixed and is the same for all resource blocks. The number of selected degrees of freedom within each resource block can be less than half the number of degrees of freedom within a resource block. According to some aspects, the number of degrees of freedom within a resource block is at least four and one degree of freedom is selected within each resource block. According to various aspects, the selected degrees of freedom are non-overlapping in time.

Figure 7:
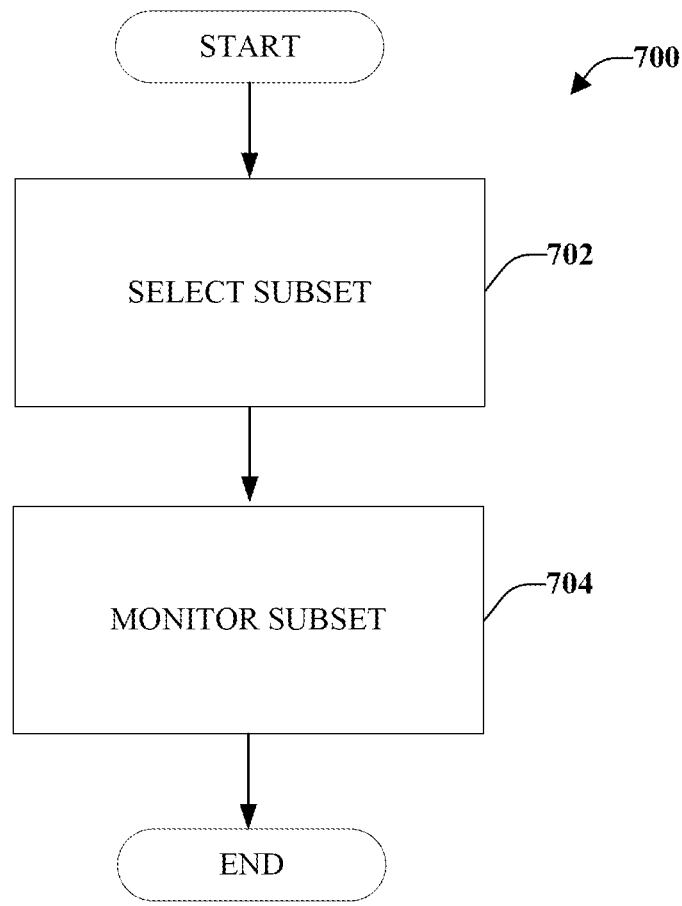
FIG. 7 illustrates a method for mitigating interference in a communication network, according to an aspect.

FIG. 7 illustrates a method 700 performed by a receiver device for mitigating interference in a communication network, according to an aspect. At 702, a subset from a plurality of disjoint subsets of degrees of freedom is chosen. The subset can be chosen as a function of an identifier that is determined by receiver device, a transmitter device, or both receiver device and transmitter device. The degree of freedom can correspond to a communication resource unit of communication network. At 704, the selected subset is monitored in order to receive a signal from transmitter device. The received signal can be an OFDM signal and a degree of freedom is a tone in the OFDM symbol. In accordance with some aspects, the communication resource of the communication network is divided into a plurality of disjoint subsets of degrees of freedom and the plurality of disjoint subsets are fixed.

Figure 8:
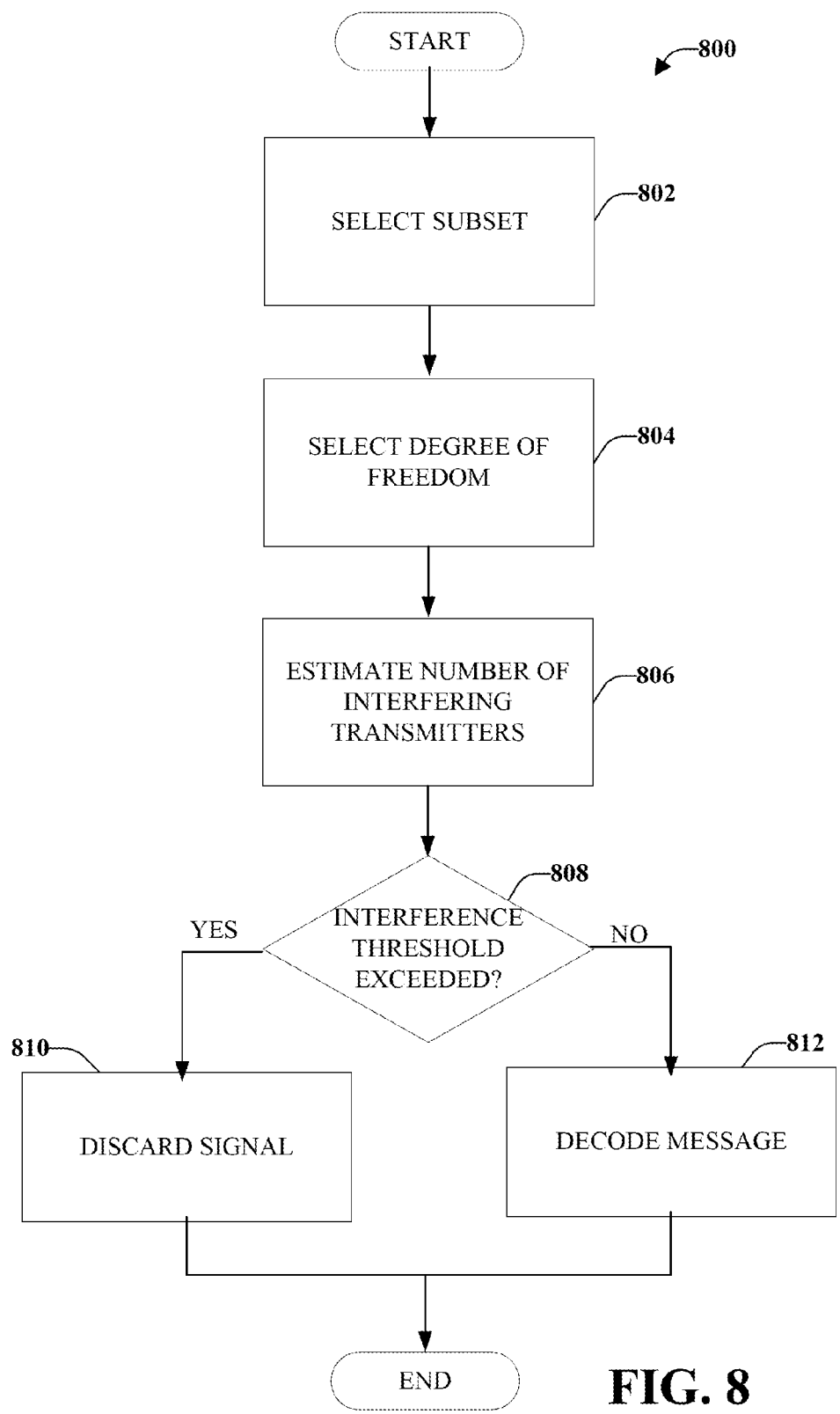
FIG. 8 illustrates a method for mitigating interference when receiving signals in a communication network, according to an aspect.

FIG. 8 illustrates a method 800 for mitigating interference when receiving signals in a communication network, according to an aspect. At 802, a subset is selected from a plurality of disjoint subsets of degrees of freedom. The selected subset includes a plurality of resource blocks. Each resource block includes a number of degrees of freedom.

At 804, at least one degree of freedom within each of the plurality of resource blocks is selected. The selection can be a function of the identifier. A number of interfering transmitters is estimated, at 806. The estimation can be a function of the energy of the received signal in the degrees of freedom of the selected subset. The interfering transmitters are transmitting interfering signals in the selected subset.

A determination is made, at 808, whether the number of interfering transmitters exceeds a threshold. If the threshold is exceeded ("YES"), at 810, the received signal is discarded. If it is determined that the number of interfering transmitters does not exceed the threshold ("NO"), at 812, the message from the received signal in the selected degrees of freedom is decoded.

Figure 9:
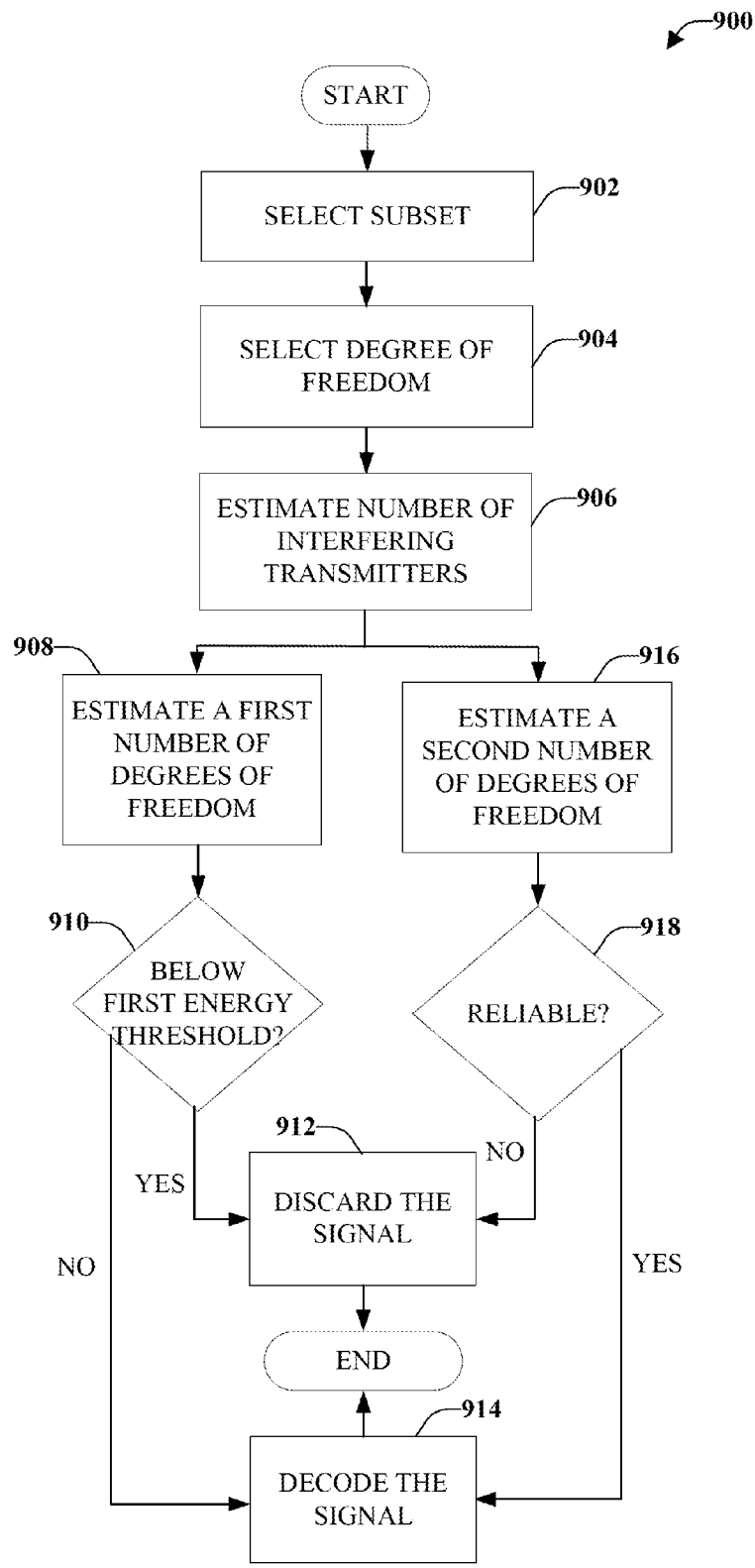
FIG. 9 illustrates a method for operating a receiving device for mitigating interferences in a communication network.

FIG. 9 illustrates a method 900 for operating a receiving device for mitigating interferences in a communication network. At 902, a subset is selected from a plurality of disjoint subsets. The subset can include a plurality of resource blocks, wherein each resource block includes a number of degrees of freedom. At 904, one or more degrees of freedom within each of the plurality of resource blocks is selected. The section can be made based on an identifier. At 906, the number of interfering transmitters is estimated. If the number of interfering transmitters exceeds an interference threshold, a message from the received signal in the selected degrees of freedom can be decoded.

Method 900 continues, at 908, where a first number of degrees of freedom among the set of selected degrees of freedom in which the energy of the received signal exceeds a first energy threshold is estimated. At 910, a determination is made whether the estimated first number is below the first energy threshold. If the estimated first number is below the first energy threshold ("YES"), at 912, the received signal is discarded. If the estimated first number is above the first energy threshold ("NO"), at 914, the received signal can be decoded.

Alternatively or additionally, at 916, a second number of degrees of freedom in a resource block in which the energy of the received signal exceeds a second energy threshold is estimated. At 918, a determination is made whether the signal received in the selected degree of freedom in the resource block is reliable. The reliability determination can be made as a function of the estimated second number and the estimated number of interfering transmitters. In accordance with some aspects, the signal received in the selected degree of freedom in the resource block is reliable if the estimated second number is greater than the estimated number of interfering transmitters. If the determination, at 918, is that the received signal is not reliable ("NO"), at 912, the received signal is discarded. If the determination is that the received signal is reliable ("YES"), at 914, the received signal can be decoded.

According to some aspects, if there is only one page being sent (e.g., the estimated number of interfering transmitters is one), the energy threshold (e.g., the number of tones that should have energy) is 24 tones out of 28 tones (in a system that utilizes 28 tones). If there are two pages being sent (e.g., the estimated number of interfering transmitters is two), then the threshold is that 26 out of 28 tones should have energy (the energy threshold is 26). If it is estimated that there are three interfering transmitters, then all the tones (e.g., 28 tones) should have energy. Increasing the number of tones that have energy (energy threshold) in proportion to the number of interfering transmitters utilizing the resource can mitigate the probability of false alarms.

Figure 10:
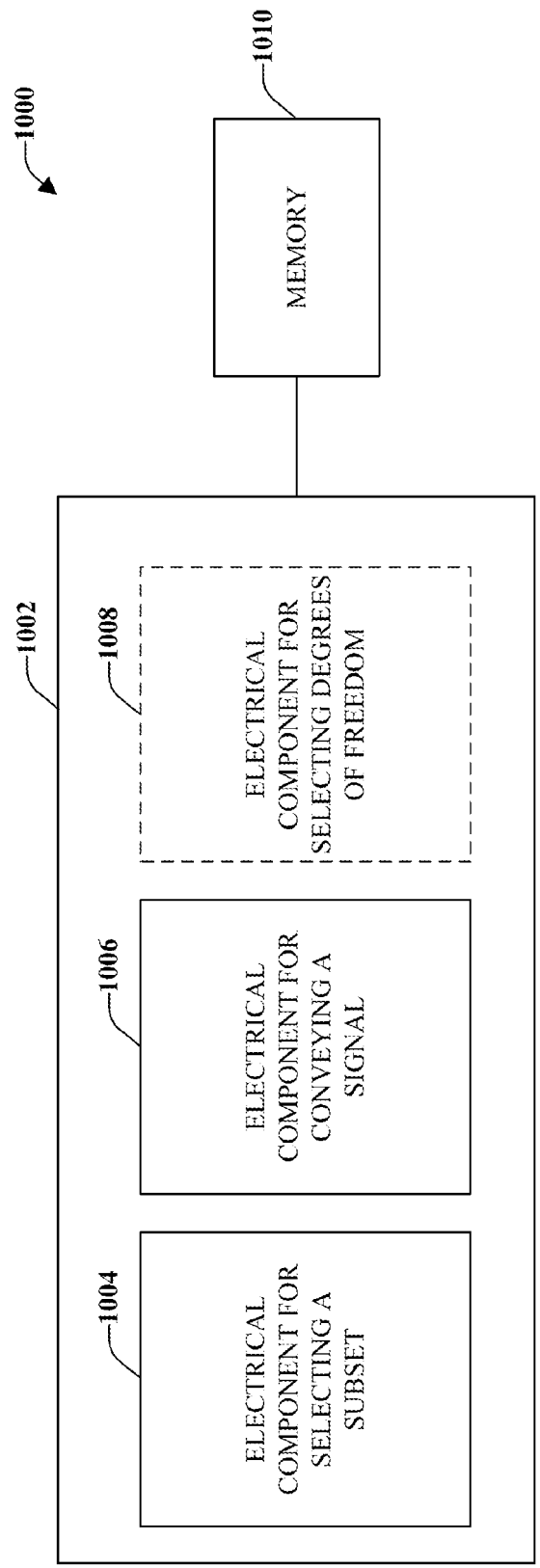
FIG. 10 illustrates a system that mitigates interference in a communication network without a centralized scheduler, according to an aspect.

With reference to FIG. 10, illustrated is a system 1000 that mitigates interference in a communication network without a centralized scheduler, according to an aspect. System 1000 can reside at least partially within a mobile device, which can be a transmitting device, according to an aspect. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 can include an electrical component 1004 for selecting a subset from a plurality of disjoint subsets of degrees of freedom as a function of an identifier. The identifier can be determined by transmitting device and/or a receiving device. A degree of freedom corresponds to a communication resource unit of a communication network. Logical grouping 1002 also includes an electrical component 1006 for conveying a signal to the receiver device using the selected subset.

In accordance with some aspects, the selected subset includes a multitude of resource blocks. Each resource block can include a number of degrees of freedom. In accordance with these aspects, logical grouping 1002 can also include an electrical 1008 for selecting at least one degree of freedom within each of the multitude of resource blocks as a function of the identifier. The signal is transmitted in the selected degrees of freedom.

According to some aspects, the signal is transmitted using at least one of phase and amplitude modulation schemes in the selected degrees of freedom. Electrical component 1006 for transmitting a signal can transmit a pilot in at least one of the selected degrees of freedom.

Additionally, system 1000 can include a memory 1010 that retains instructions for executing functions associated with electrical components 1004, 1006, and 1008, or other components. While shown as being external to memory 1010, it is to be understood that one or more of electrical components 1004, 1006, and 1008 can exist within memory 1010.

Figure 11:
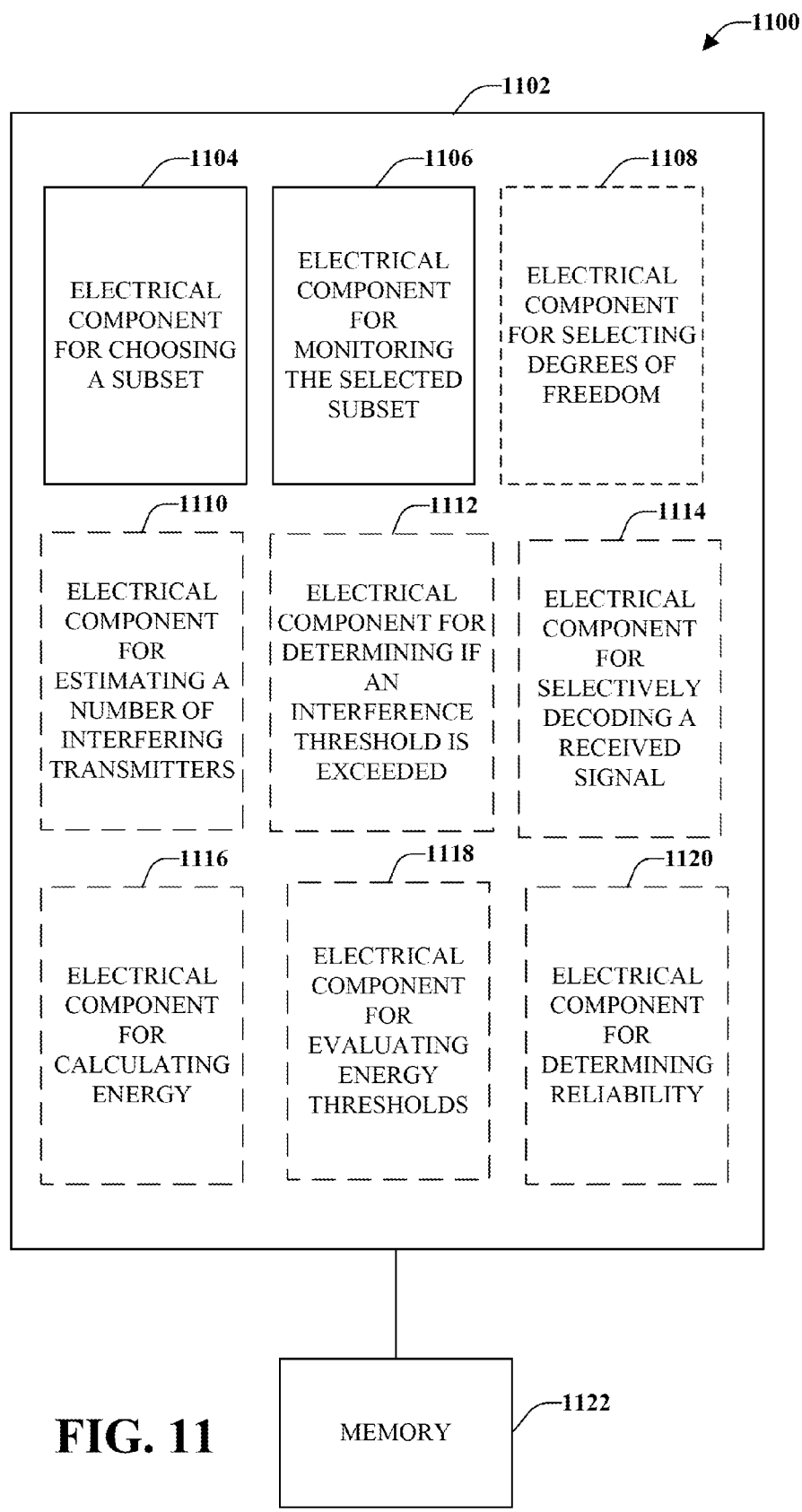
FIG. 11 illustrates a system that mitigates interference in a communication network, according to an aspect.

With reference to FIG. 11, illustrated is a system 1100 that mitigates interference in a communication network, according to an aspect. System 1100 can reside at least partially within a mobile device, which can be a receiving device. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. Logical grouping 1102 can include an electrical component 1104 for selecting a subset from a plurality of disjoint subsets of degrees of freedom. The selection can be a function of an identifier that is determined by receiving device, transmitting device, or both receiving device and transmitting device. A degree of freedom corresponds to a communication resource unit of the communication network. Logical grouping 1102 also includes an electrical component 1106 for monitoring the selected subset in order to receive a signal from the transmitting device.

In accordance with some aspects, the selected subset includes a plurality of resource blocks. Each resource block includes a number of degrees of freedom. Logical grouping 1102 can include an electrical component 1108 for selecting at least one degree of freedom within each of the plurality of resource blocks as a function of the identifier. Also included in logical grouping 1102 can be an electrical component 1110 for estimating the number of interfering transmitters as a function of the energy of the received signal in the degrees of freedom of the selected subset. The interfering transmitters are transmitting interfering signals in the selected subset. An electrical component 1112 for determining if the number of interfering transmitters exceeds an interference threshold is included in logical grouping 1102. If the interference threshold is not exceeded, an electrical component 1114 for decoding decodes the message from the received signal in the selected degrees of freedom. If the interference threshold is exceeded, the received signal is discarded.

Alternatively or additionally, logical grouping 1102 can include an electrical component 1116 for calculating a number of degrees of freedom in the received signal that include energy and an electrical component 1118 for evaluating energy levels as a function of the energy calculation. For example, electrical component 1116 can calculate a first number of degrees of freedom among the set of the selected degrees of freedom in which the energy of the received signal exceeds a first energy threshold and electrical component 1118 can determine if the first number is below a first energy threshold. If the number is below the first energy threshold, the received signal can be discard.

In accordance with some aspects, electrical component 1116 can estimate a second number of degrees of freedom in a resource block in which the energy of the received signal exceeds a second energy threshold. An electrical component 1120 for determining reliability can decide if the signal received in the selected degree of freedom in the resource block is reliable as a function of the estimated second number and the number of interferes estimated by electrical component 1110. If the signal is not reliable, the received signal in the selected degree of freedom can be discarded. Electrical component 1120 can determine the signal is reliable if the estimated second number is greater than the estimated number of interfering transmitters.

Additionally, system 1100 can include a memory 1122 that retains instructions for executing functions associated with electrical components 1104, 1106, 1108, 1110, 1112, 1114, 1116, 1118, and 1120, or other components. While shown as being external to memory 1122, it is to be understood that one or more of electrical components 1104, 1106, 1108, 1110, 1112, 1114, 1116, 1118, and 1120 can exist within memory 1122.

Figure 12:
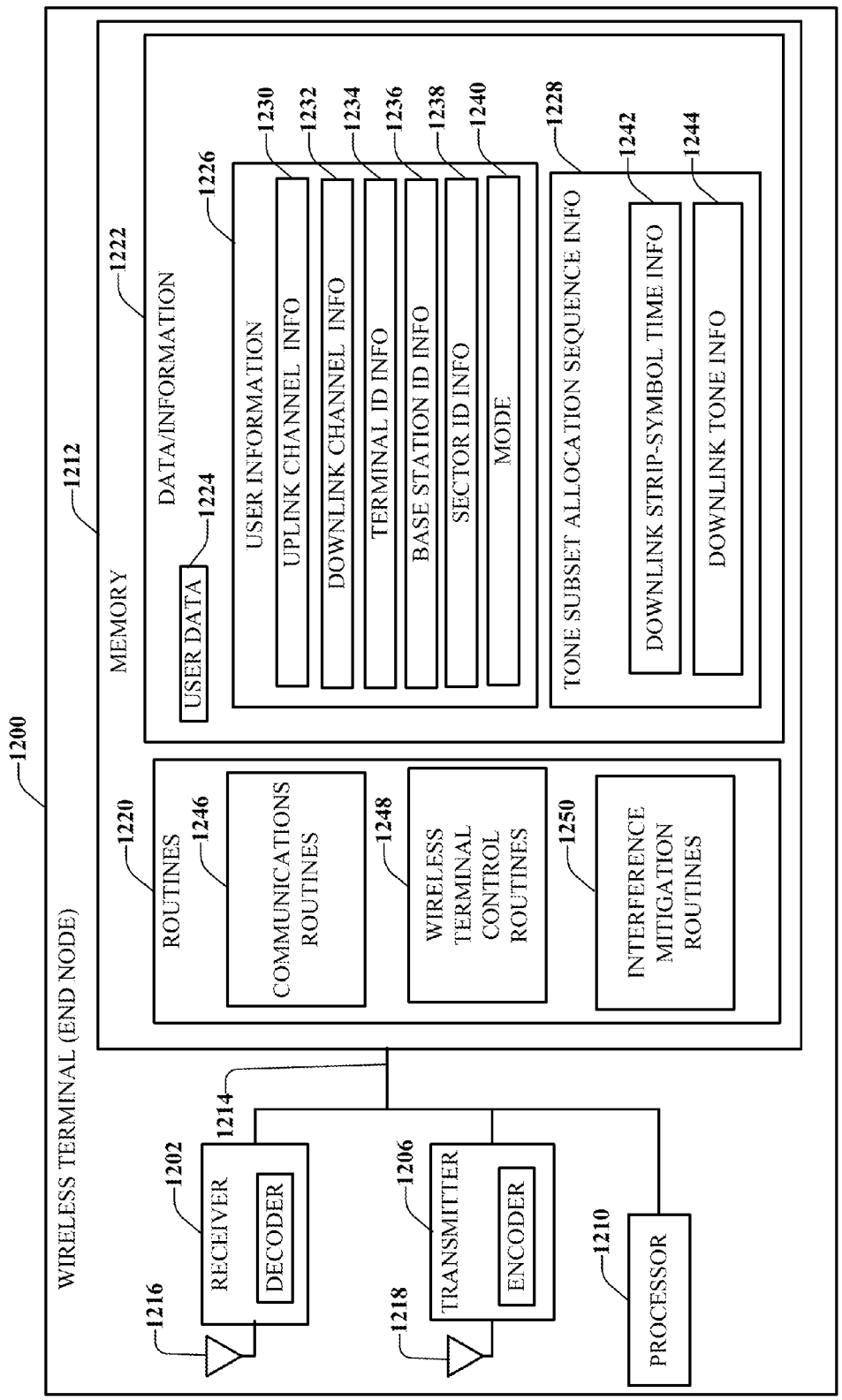
FIG. 12 illustrates an example wireless terminal in accordance with one or more of the disclosed aspects.

FIG. 12 illustrates an example wireless terminal (e.g., mobile device, transmitting device, receiving device, and so forth) 1200, which can be used as any one of the wireless terminals (e.g., mobile devices, transmitting device, receiving device, and so on) described herein. According to various aspects, wireless terminal 1200 implements interference mitigation in a communication network. Wireless terminal 1200 includes a receiver 1202 that includes a decoder 1204, a transmitter 1206 that includes an encoder 1208, a processor 1210, and a memory 1212 which are coupled together by a bus 1214 over which the various elements 1202, 1206, 1210, 1212 can interchange data and information. An antenna 1216 used for receiving signals from a transmitting device is coupled to receiver 1202. An antenna 1218 used for transmitting signals (e.g., to a receiving device, to a peer node) is coupled to transmitter 1206. Processor 1210 (e.g., a CPU) controls operation of wireless terminal 1200 and implements methods by executing routines 1220 and using data/information 1222 in memory 1212.

Data/information 1222 includes user data 1224, user information 1226, and tone subset allocation sequence information 1228. User data 1224 can include data, intended for a peer node, which will be routed to encoder 1208 for encoding prior to transmission by transmitter 1206, and data received from a peer node, which has been processed by decoder 1204 in receiver 1202. User information 1226 includes uplink channel information 1230 and downlink channel information

1232. Uplink channel information 1230 includes information identifying uplink channels segments that have been assigned for wireless terminal 1200 to use when transmitting information. Uplink channels can include uplink traffic channels, dedicated uplink control channels (e.g., request channels, power control channels and timing control channels). Each uplink channel includes one or more logic tones, each logical tone following an uplink tone hopping sequence. The uplink hopping sequences are different between each sector type of a cell and between adjacent cells. Downlink channel information 1232 includes information identifying downlink channel segments that have been assigned to wireless terminal 1200 for use when receiving data/information. Downlink channels may include downlink traffic channels and assignment channels, each downlink channel including one or more logical tone, each logical tone following a downlink hopping sequence, which is synchronized between each sector of the cell.

User information 1226 also includes terminal ID information 1234, which is an assigned identification, base station ID information 1236, which identifies the specific base station that wireless terminal 1200 might have established communications with, and sector ID info 1238, which identifies the specific sector of the cell where wireless terminal 1200 is presently located. Base station ID 1236 provides a cell slope value and sector ID info 1238 provides a sector index type; the cell slope value and sector index type may be used to derive tone hopping sequences. Mode information 1240, also included in user information 1226, identifies whether the wireless terminal 1200 is in sleep mode, hold mode, on mode, and so forth.

Tone subset allocation sequence information 1228 includes downlink strip-symbol time information 1242 and downlink tone information 1244. Downlink strip-symbol time information 1242 includes frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1244 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1246 and wireless terminal control routines 1248. Communications routines 1246 control the various communications protocols used by wireless terminal 1200. For example, communications routines 1246 can enable communicating through a wide area network and/or a local area peer-to-peer network (e.g., directly with disparate wireless terminal(s)). By way of further example, communications routines 1246 can enable receiving a broadcast signal. Wireless terminal control routines 1248 control basic wireless terminal 1200 functionality including the control of the receiver 1202 and transmitter 1206.

Routines 1220 can also include interference mitigation routines 1250. When transmitting information, interference mitigation routines 1250 can include selecting a subset from a multitude of disjoint subsets of degrees of freedom and transmitting a signal using the selected subset. When receiving information, interference mitigation routines 1250 can include selecting a subset from a multitude of disjoint subsets of degrees of freedom and monitoring the selected subset in order to receive a signal. Further, interference mitigation routines 1250 for receiving information can include estimating a number of interfering transmitters (or simultaneous communication pairs), determining that the number of interferers are small, estimating a first number of degrees of freedom with energy within a selected set of degrees of freedom in which a desired signal is expected, and ascertaining there are enough number of degrees of freedom carrying the desired signal. In accordance with some aspects, the receiving interference mitigation routines 1250 includes, in each resource block, estimating a second number of degrees of freedom with energy to determine whether a collision occurs in that resource block, determining a desired signal is not collided and declaring the desired signal in that resource block is clean and can be used for decoding.

Figure 13:
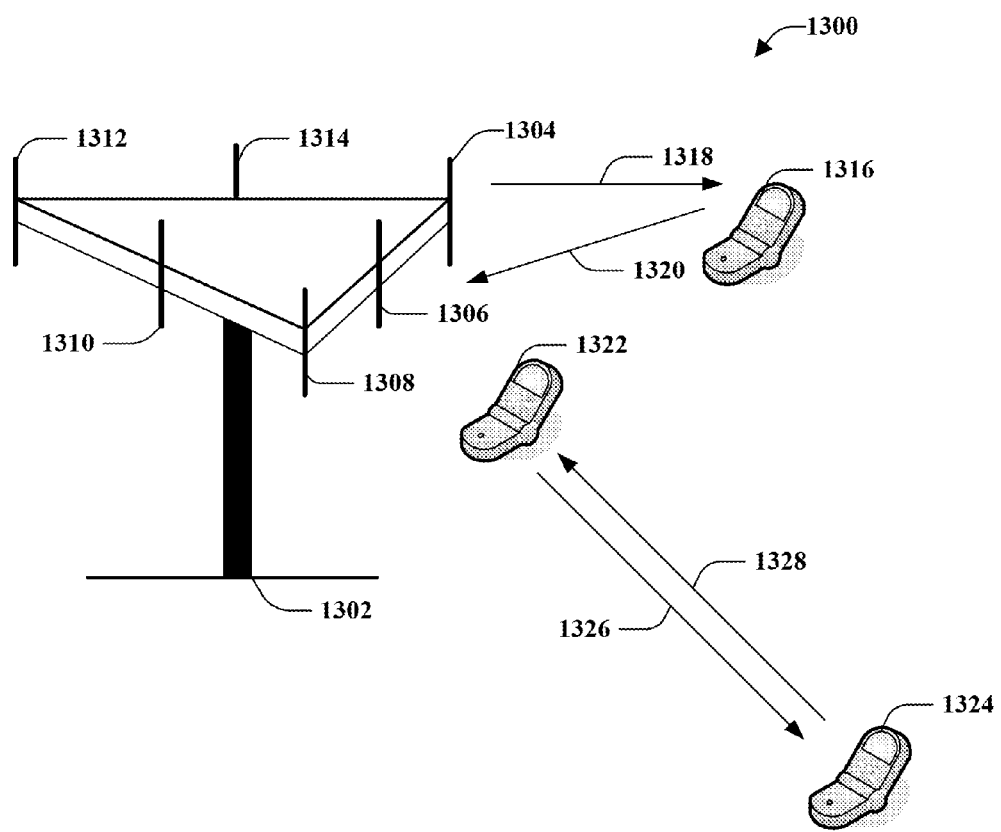
FIG. 13 illustrates a wireless communication system in accordance with various aspects presented herein.

Referring now to FIG. 13, illustrated is a wireless communication system 1300 in accordance with various aspects. System 1300 comprises a base station 1302 that can include multiple antenna groups. For example, one antenna group can include antennas 1304 and 1306, another group can comprise antennas 1308 and 1310, and an additional group can include antennas 1312 and 1314. Two antennas are illustrated for each antenna group; however, more or fewer antennas can be utilized for each group. Base station 1302 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 1302 can be a home base station, a Femto base station, and/or the like.

Base station 1302 can communicate with one or more devices such as device 1316; however, it is to be appreciated that base station 1302 can communicate with substantially any number of devices similar to device 1316. As depicted, device 1316 is in communication with antennas 1304 and 1306, where antennas 1304 and 1306 transmit information to device 1316 over a forward link 1318 and receive information from device 1316 over a reverse link 1320. In a frequency division duplex (FDD) system, forward link 1318 can utilize a different frequency band than that used by reverse link 1320, for example. Further, in a time division duplex (TDD) system, forward link 1318 and reverse link 1320 can utilize a common frequency band.

In addition, devices 1322 and 1324 can be communicating with one another, such as in a peer-to-peer configuration. Moreover, device 1322 is in communication with device 1324 using links 1326 and 1328. In a peer-to-peer ad hoc network, devices within range of each other, such as devices 1322 and 1324, communicate directly with each other without a base station 1302 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 14:
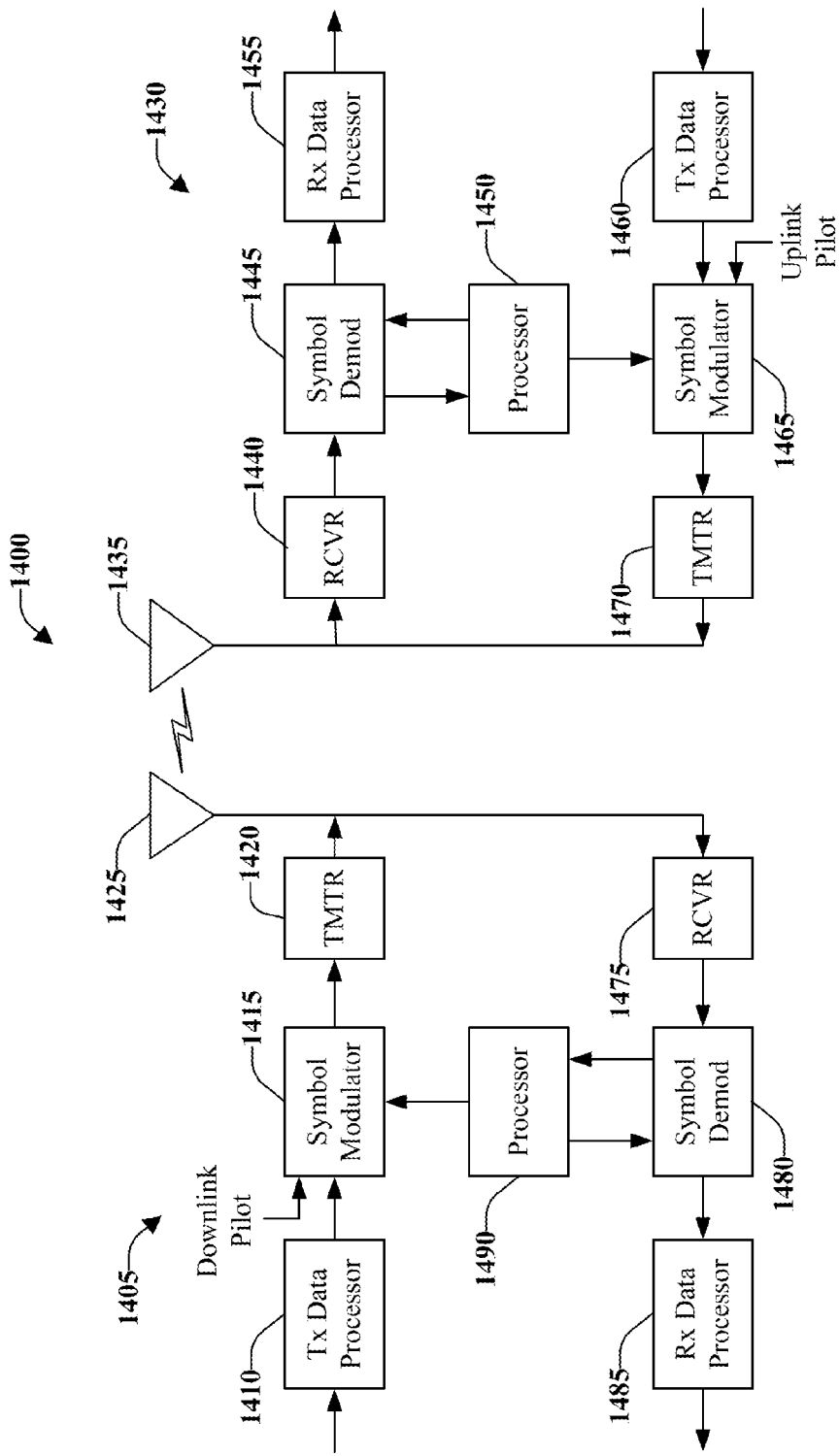
FIG. 14 illustrates an exemplary wireless communication system, according to various aspects.

FIG. 14 illustrates an exemplary wireless communication system 1400, according to various aspects. Wireless communication system 1400 depicts one base station and one terminal for sake of brevity. However, it is to be appreciated that system 1400 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 14, on a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. Symbol modulator 1415 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 obtains N received symbols and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink.

Processors 1490 and 1450 direct (e.g., control, coordinate, manage, and so on) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1490 and 1450.

It is to be understood that the aspects described herein may be implemented by hardware, software, firmware, or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for operating a transmitter device for mitigating interference in a communication network, comprising:
selecting a subset from a plurality of disjoint subsets of degrees of freedom as a function of an identifier, the identifier is determined by at least one of the transmitter device or a receiver device or combinations thereof, wherein a degree of freedom corresponds to a communication resource unit of the communication network; and
transmitting a signal to the receiver device using the selected subset.

2. The method of claim 1, wherein the communication resource is divided into the plurality of disjoint subsets of degrees of freedom and the plurality of disjoint subsets are fixed.

3. The method of claim 1, wherein the selected subset includes a plurality of resource blocks, each of the resource blocks comprises a number of degrees of freedom, the method further comprising:
selecting at least one degree of freedom within each of the plurality of resource blocks as a function of the identifier, wherein the signal is transmitted in the selected degrees of freedom.

4. The method of claim 3, wherein the signal is transmitted using at least one of phase and amplitude modulation schemes in the selected degrees of freedom, the method further comprising:
transmitting a pilot in at least one of the selected degrees of freedom.

5. The method of claim 3, wherein the number of degrees of freedom within a resource block is fixed and the same for all resource blocks and the number of selected degrees of freedom within each resource block is less than half the number of degrees of freedom within the resource block.

6. The method of claim 5, wherein the number of degrees of freedom within the resource block is at least four and one degree of freedom is selected within each resource block.

7. The method of claim 3, wherein the selected degrees of freedom are non-overlapping in time.

8. The method of claim 1, wherein the transmitted signal is an OFDM signal and a degree of freedom is a tone in the OFDM symbol.

9. The method of claim 1, wherein the transmitted signal is a paging signal and the identifier is a paging identifier of the receiver device.

10. A wireless communications apparatus, comprising:
a memory that retains instructions related to choosing a subset from a plurality of disjoint subsets of degrees of freedom as a function of a chosen identifier and transmitting a signal to a receiver device using the selected subset, wherein a degree of freedom corresponds to a communication resource unit of a communication network; and
a processor, coupled to the memory, configured to execute the instructions retained in the memory.

11. The wireless communications apparatus of claim 10, wherein the selected subset includes a plurality of resource blocks, each of the resource blocks comprises a number of degrees of freedom, the memory retains further instructions related to choosing at least one degree of freedom within each of the plurality of resource blocks as a function of the identifier, the signal is transmitted in the selected degrees of freedom.

12. The wireless communications apparatus of claim 11, the memory retains further instructions related to transmitting a pilot in at least one of the selected degrees of freedom, wherein the signal is transmitted using at least one of phase and amplitude modulation schemes in the selected degrees of freedom.

13. The wireless communications apparatus of claim 11, wherein the number of degrees of freedom within each resource block is fixed and the same for all resource blocks and the number of selected degrees of freedom within each resource block is less than half the number of degrees of freedom within the resource block.

14. A wireless communications apparatus that mitigates interference in a communication network, comprising:
means for choosing a subset from a plurality of disjoint subsets of degrees of freedom as a function of an identifier, wherein a degree of freedom corresponds to a communication resource unit of the communication network; and
means for conveying a signal using the selected subset.

15. The wireless communications apparatus of claim 14, wherein the selected subset includes a plurality of resource blocks, each of the resource blocks comprises a number of degrees of freedom, the apparatus further comprising:
means for selecting at least one degree of freedom within each of the plurality of resource blocks as a function of the identifier, wherein the signal is transmitted in the selected degrees of freedom.

16. The wireless communications apparatus of claim 15, wherein the signal is transmitted using at least one of phase and amplitude modulation schemes in the selected degrees of freedom, the means for conveying transmits a pilot in at least one of the selected degrees of freedom.

17. At least one processor configured to mitigate interference in a communication network that does not have a centralized scheduler, comprising:
a first module for selecting a subset from a plurality of disjoint subsets of degrees of freedom as a function of an identifier, the identifier is determined by at least one of the transmitter device or a receiver device, wherein a degree of freedom corresponds to a communication resource unit of the communication network; and
a second module for transmitting a signal to the receiver device using the selected subset, wherein the transmitted signal is a paging signal and the identifier is a paging identifier of the receiver device.

* * * * *